US012320502B2

(12) United States Patent
Kiff

(10) Patent No.: US 12,320,502 B2
(45) Date of Patent: Jun. 3, 2025

(54) COMPLEX ENVIRONMENT TROFFER

(71) Applicant: HLI Solutions, Inc., Greenville, SC (US)

(72) Inventor: Stephen Andrew Kiff, Greenville, SC (US)

(73) Assignee: HLI SOLUTIONS, INC., Greenville, SC (US)

( * ) Notice: Subject to any disclaimer, the term of this patent is extended or adjusted under 35 U.S.C. 154(b) by 0 days.

(21) Appl. No.: 18/796,491

(22) Filed: Aug. 7, 2024

(65) Prior Publication Data

US 2024/0401784 A1 Dec. 5, 2024

Related U.S. Application Data

(63) Continuation of application No. 18/023,602, filed as application No. PCT/US2021/047263 on Aug. 24, 2021, now Pat. No. 12,066,171.

(Continued)

(51) Int. Cl.
*F21V 21/04* (2006.01)
*F21S 8/02* (2006.01)

(Continued)

(52) U.S. Cl.
CPC ............ *F21V 21/048* (2013.01); *F21S 8/026* (2013.01); *F21V 7/04* (2013.01); *F21V 19/0015* (2013.01); *F21V 31/005* (2013.01)

(58) Field of Classification Search
CPC ...... F21V 21/048; F21V 7/04; F21V 19/0015; F21V 31/005; F21V 15/01; F21V 7/00;

(Continued)

(56) References Cited

U.S. PATENT DOCUMENTS 5,902,035 A * 5/1999 Mui ........................ F21V 21/04 362/147
6,428,183 B1 * 8/2002 McAlpin ............... F21V 7/0016 362/147

(Continued)

OTHER PUBLICATIONS

Information Disclosure Statement dated Feb. 27, 2024 which was filed in connection with U.S. Appl. No. 18/023,602.

(Continued)

*Primary Examiner* — Bao Q Truong

(74) *Attorney, Agent, or Firm* — Buckley, Maschoff & Talwalkar LLC

(57) ABSTRACT

A light fixture configured for securing to a support surface. The light fixture includes a housing, a tray connected to the housing, a plurality of reflectors connected to the tray, a plurality of light emitter boards, a control component positioned within the housing, and a door assembly releasably connected to the housing. The tray includes a series of base portions and a series of angled walls, wherein each angled wall extends from a base portion. Each reflector of the plurality of reflectors is connected to an angled wall of the tray. Each light emitter board of the plurality of light emitter boards is connected to a reflector, and the control component is operably connected to the plurality of light emitter boards. In addition, the door assembly includes a frame bordering a central opening, a lens positioned over the central opening, and a gasket positioned between the lens and the frame.

14 Claims, 7 Drawing Sheets

Related U.S. Application Data

(60) Provisional application No. 63/071,100, filed on Aug. 27, 2020.

(51) Int. Cl.

| | |
|---|---|
| ***F21V 7/04*** | (2006.01) |
| ***F21V 19/00*** | (2006.01) |
| ***F21V 31/00*** | (2006.01) |

(58) Field of Classification Search

CPC ........ F21V 7/0083; F21V 7/005; F21S 8/026; F21Y 2103/10

See application file for complete search history.

(56) References Cited

U.S. PATENT DOCUMENTS

| | | | | |
|---|---|---|---|---|
| 7,766,503 | B2 * | 8/2010 | Heiking .................. | F21S 8/026 362/147 |
| 8,523,383 | B1 | 9/2013 | Grigore et al. | |
| 9,057,502 | B2 * | 6/2015 | Kong ...................... | F21V 17/02 |
| 9,279,553 | B1 | 3/2016 | Scribante et al. | |
| 9,897,305 | B2 * | 2/2018 | Ryder .................. | G02B 6/0073 |
| 10,012,355 | B2 | 7/2018 | Scribante et al. | |
| 2004/0090784 | A1 | 5/2004 | Ward | |
| 2013/0077294 | A1 | 3/2013 | Stein et al. | |
| 2015/0276125 | A1 | 10/2015 | Pratt et al. | |
| 2015/0338084 | A1 | 11/2015 | Ryder et al. | |
| 2017/0114970 | A1 | 4/2017 | Scribante et al. | |
| 2018/0066813 | A1 | 3/2018 | McCane et al. | |

OTHER PUBLICATIONS

International Search Report and Written Opinion mailed in Application No. PCT/US2021/047263, dated Nov. 30, JQ21.

International Search Report and Written Opinion mailed in Application No. PCT/US2021/047263, dated Nov. 30, 2021.

* cited by examiner

COMPLEX ENVIRONMENT TROFFER

CROSS-REFERENCE TO RELATED APPLICATION

This application claims the benefit of U.S. patent application Ser. No. 18/023,602 filed on Aug. 24, 2021, which claims priority to U.S. Provisional Patent Application No. 63/071,100 filed on Aug. 27, 2020, the contents of which are hereby incorporated by reference for all purposes.

FIELD

The present disclosure relates to light fixtures, and particularly to a recessed light fixture.

BACKGROUND

Numerous lighting fixtures for directly illuminating areas are generally known. A common lighting assembly used in ceilings of commercial buildings includes a troffer with one or more downwardly facing light emitters. A modular dropped ceiling grid is generally formed of interconnected inverted T-bars that are permanently attached to rigid ceiling supports, via wires or other structural means, to form a rectangular or square grid structure. Troffer lighting fixtures and ceiling tiles rest within the rectangular or square grid structure to complete the drop ceiling. Troffer lighting fixtures include a housing having four sidewalls forming a square or rectangular shape to fit within the rectangular or square grid structure. When installed, the housing is recessed within the drop ceiling.

SUMMARY

According to certain aspects, a light fixture includes a housing configured to be secured to a support surface. The housing includes a first end, a second end, and a first and a second side extending between the first end and the second end. A control component is positioned in the housing. A reflector assembly is positioned in the housing. A light emitter is connected to the reflector assembly. A door assembly is releasably connected to the housing. The door assembly has a frame bordering a central opening, a lens, positioned over the central opening, and a gasket positioned between the lens and the frame.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
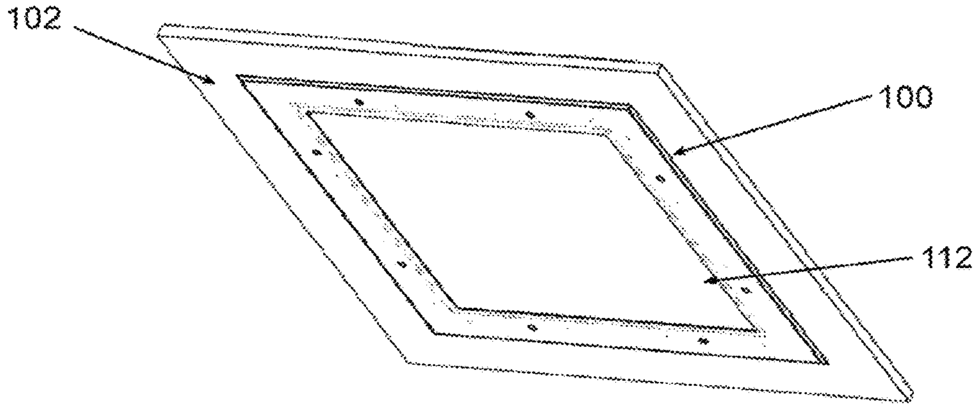
FIG. 1 is a bottom-perspective view of a light fixture in a surrounding ceiling panel.

FIG. 1 shows an example of a troffer light fixture 100 is supported in a recessed position relative to a ceiling 102 such that the bottom of the troffer is substantially flush with the ceiling 102. The light fixture 100 includes a central opening through which light is emitted to an area, for example a room. In certain aspects, the light fixture 100 has a rectangular or square shape and is sized to fit in a specific ceiling opening. For example, the light fixture 100 may be sized to fit within a two-foot by two-foot (2 ft. by 2 ft.), 1 ft. by 2 ft., 1 ft. by 4 ft., 2 ft. by 4 ft., or other similar recesses. Other rectilinear or curvilinear shapes can also be used.

Figure 2:
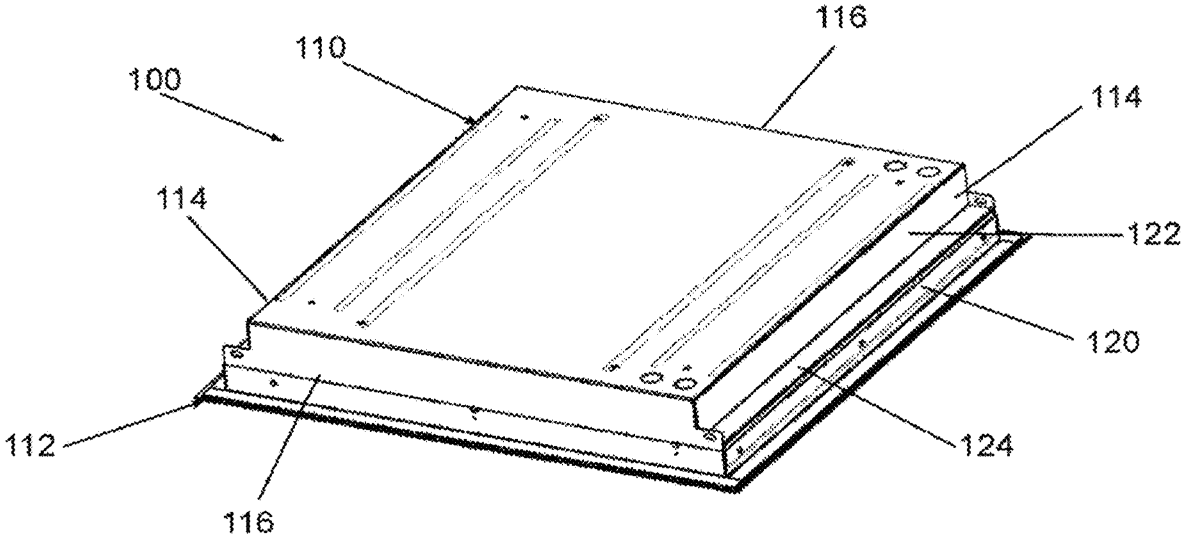
FIG. 2 is a top-perspective view of the light fixture of FIG. 1.
Figure 3:
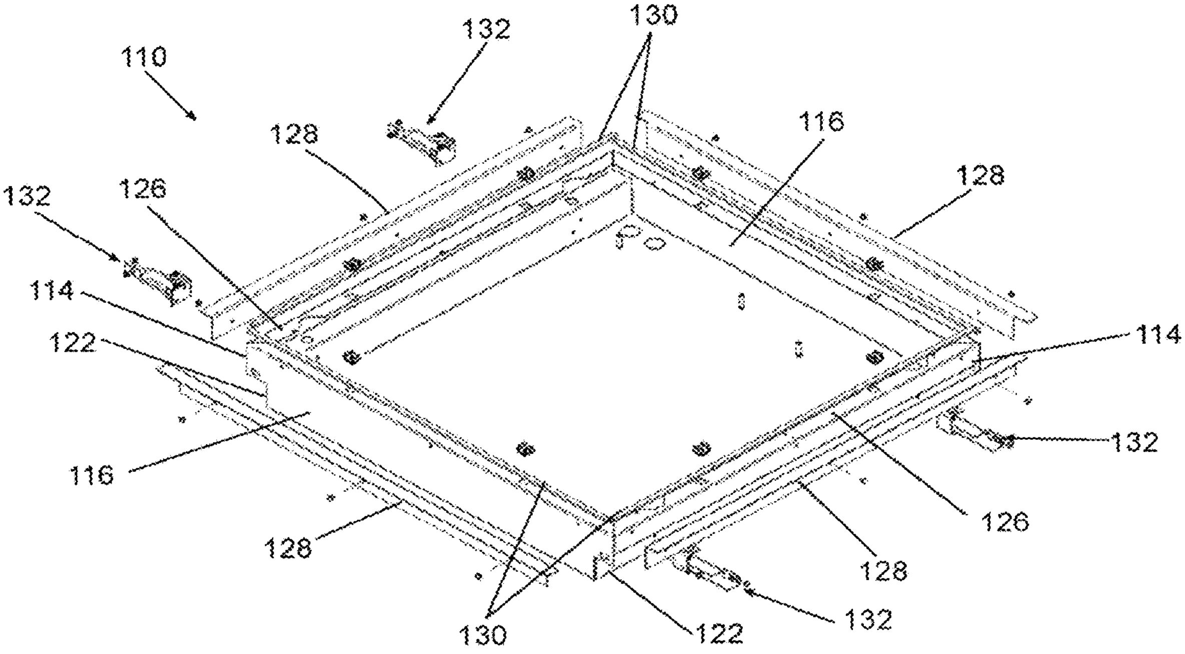
FIG. 3 is a bottom perspective, assembly view of the housing of FIG. 1.

As best shown in FIGS. 2 and 3, the light fixture 100 includes a housing 110 and a door assembly 112. The housing 110 includes first and second sides 114, first and second ends 116, and a top 118. The first and second sides 114 can each include a lower vertical section 120 and an upper vertical section 122 connected by a horizontal section 124. This forms a stepped configuration where a lower portion of the housing 110 is wider than the upper portion. A lower edge 126 can extend from the sides 114 and ends 116. The sides 114, ends 116, top 118, and lower edge 126 can be formed from one or more discrete extruded metallic members. In certain aspects, housing 110 can be formed as a unitary structure. For example, housing 110 can be formed from a single piece of stamped material and folded into an appropriate shape.

In certain aspects, one or more flanges 128 are connected to the housing 110, as best shown in FIG. 3. For example, a flange 128 can be connected to each of the sides 114 and ends 116. Flanges 128 can be attached with one or more fasteners. In an exemplary embodiment, rivets are used to connect the flanges 128 to the housing 110. In certain aspects, a housing gasket 130 can be connected to the lower edge 126. The housing gasket 130 can extend along the full length of the sides 114 and ends 116.

Figure 4:
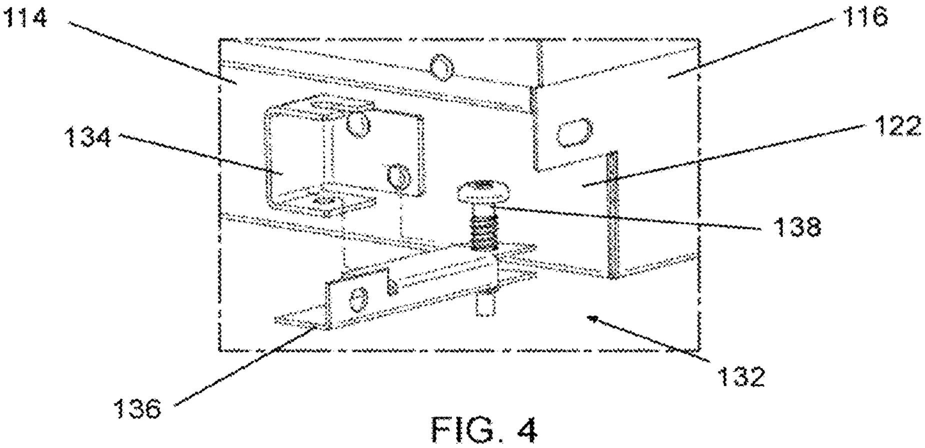
FIG. 4 is an enlarged view of the wing hanger assembly of FIG. 3.

One or more adjustable wing hangers 132 can also be connected to the housing 110. For example, a pair of wing hangers 132 can be connected to each of the sides 114. As best shown in FIG. 4, the winger hangers 132 include a bracket 134 connected to the side 114 and an adjustment arm 136 movably connected to the bracket 134. The adjustment arm 136 can be connected to the bracket 134 by a threaded fastener 138. Rotation of the fastener 138 can move the arm 136 relative to the bracket 134. When placed in a ceiling or other support structure, the position of the wing hangers 132 can be adjusted to provide level mounting of the housing 110. For example, arms 136 can engage a T-bar support structure, and the position of the arms 136 can be adjusted for level mounting of the housing 110 on the T-bars.

Figure 5:
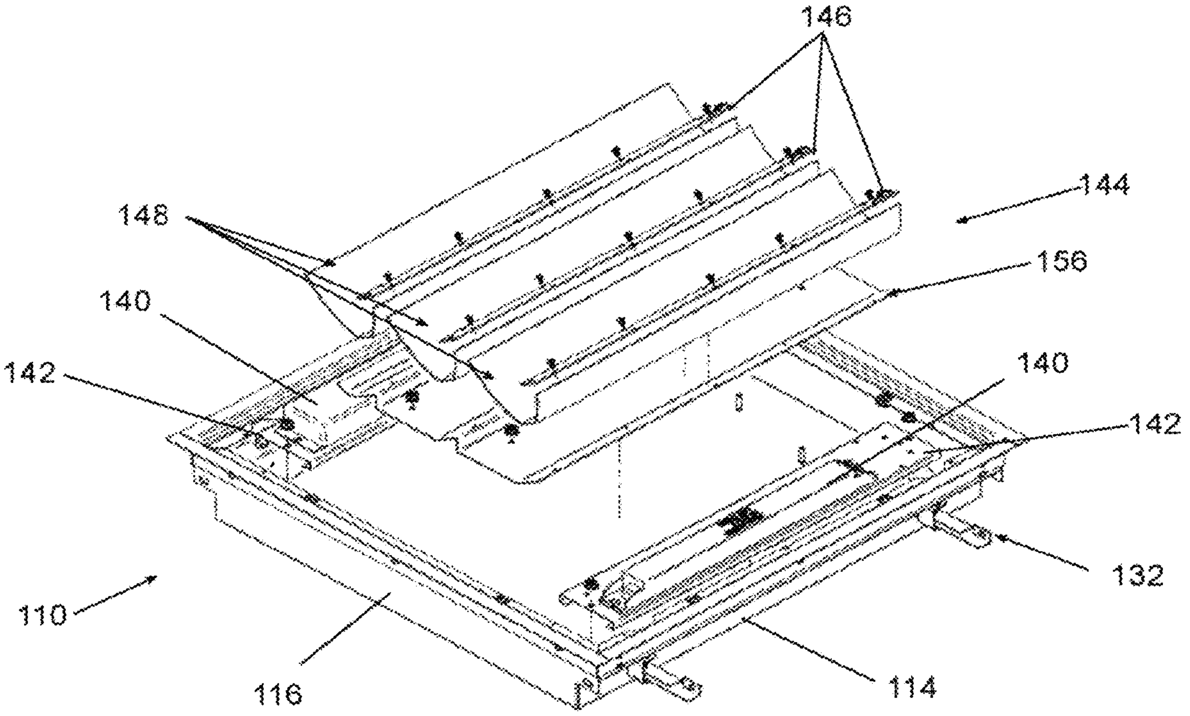
FIG. 5 is a bottom perspective, assembly view of exemplary control components and an asymmetric reflector assembly and light emitters.

As best shown in FIG. 5, housing 110 contains one or more associated electrical control components, such as drivers, controllers, sensors, etc. for operating one or more light emitters. The control components can be connected to the top 118 of the housing 110. In the illustrated example, the control components include drivers 140 that are individually mounted to a support 142 that is attached to a lower surface of the top 118. The drivers 140 can then be removed individually or as a group from the housing 110 as needed. Knockouts can be formed in the top of the housing 110 so that one or more main power supply lines can be run inside of the housing 110 and connected to one or more of the control components.

The housing 110 contains a light emitter assembly configured to provide a specific light distribution from the housing 110. FIG. 5 shows an exemplary embodiment of an asymmetric light emitter assembly 144 that includes a plurality of LED boards 146. The LED boards 146 include a plurality of LEDs mounted on a circuit board. The control components can be connected to the LED boards 146 to provide power and control the activation of the LEDs. The control components can also be configured to provide dimming, color tuning, or other output control.

The LED boards 146 are mounted to a respective reflector 148. Each of the reflectors 148 has a base 150 for receiving the LED boards, a first side 152 extending from the base at an angle, and a second side 154 extending from the base at an angle. In the illustrated embodiment, the first and second sides 152, 154 extend from the base in an arcing configuration. The first and second sides 152, 154 can have one or more radii of curvature as it extends from the base 150. Other configuration can utilize rectilinear portions, other curved portions, or any combination thereof. One of the sides 152, 154 of the reflector 148 is longer than the other, and the base 150 is oriented at an oblique angle to each of the sides 152, 154.

Figure 6:
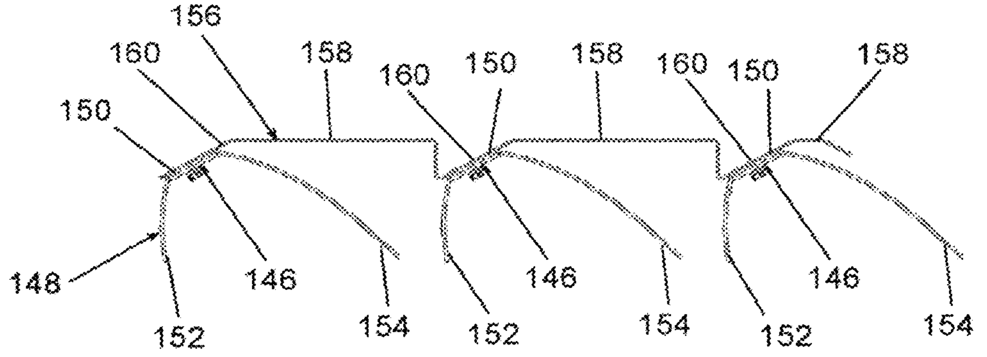
FIG. 6 is a side view of the reflector assembly and light emitters of FIG. 5.

Each of the reflectors 148 is connected to a tray 156. As best shown in FIG. 6, the tray 156 includes a series of base portions 158 and a series of angled walls 160 extending from the base portion 158. In an exemplary embodiment, the angled walls 160 extend at approximately twenty (20) degrees relative to the base portion 158. Each of the angled walls 160 receives a reflector 148. The tray 156 is connected to the lower surface of the top 118 of the housing 110. The orientation and configuration of the light emitter assembly 144 can therefore provide an asymmetric light output directed to one side of the housing 110. The LED boards 146 and reflectors 148 are oriented to direct light non-perpendicular to the top 118 of the housing 110 and the ceiling panel 102. The position of the light emitter assembly 144 can be switched so that light is oriented to either side as desired.

Figure 7:
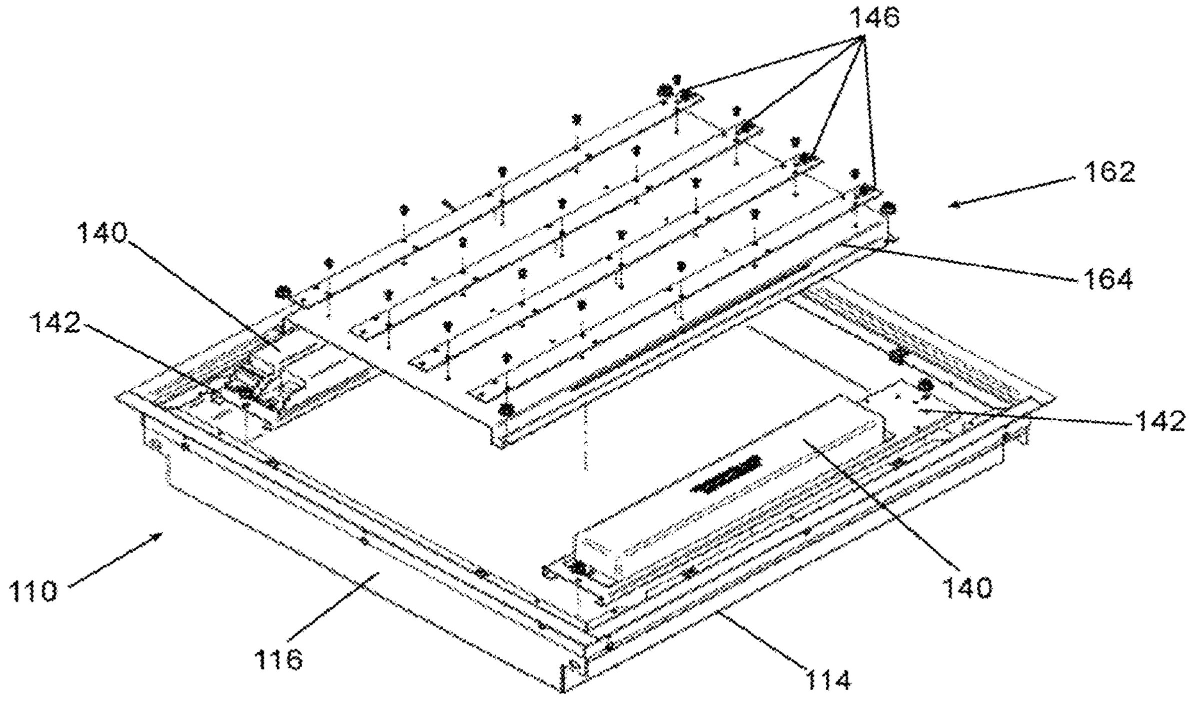
FIG. 7 is a bottom perspective, assembly view of exemplary control components and a symmetric reflector assembly and light emitters.

FIG. 7 shows another exemplary embodiment of a symmetric light emitter assembly 162 that includes a plurality of LED boards 146 connected to a tray 164. The tray 164 includes a flat base for receiving the LED boards 146. Tray 164 is connected to the lower surface of the top 118 of the housing 110. The orientation and configuration of the light emitter assembly 162 can provide a symmetric light output, with the LED boards 146 oriented to emit light substantially perpendicular to the top 118 of the housing 110 and the ceiling panel 102.

Figure 8:
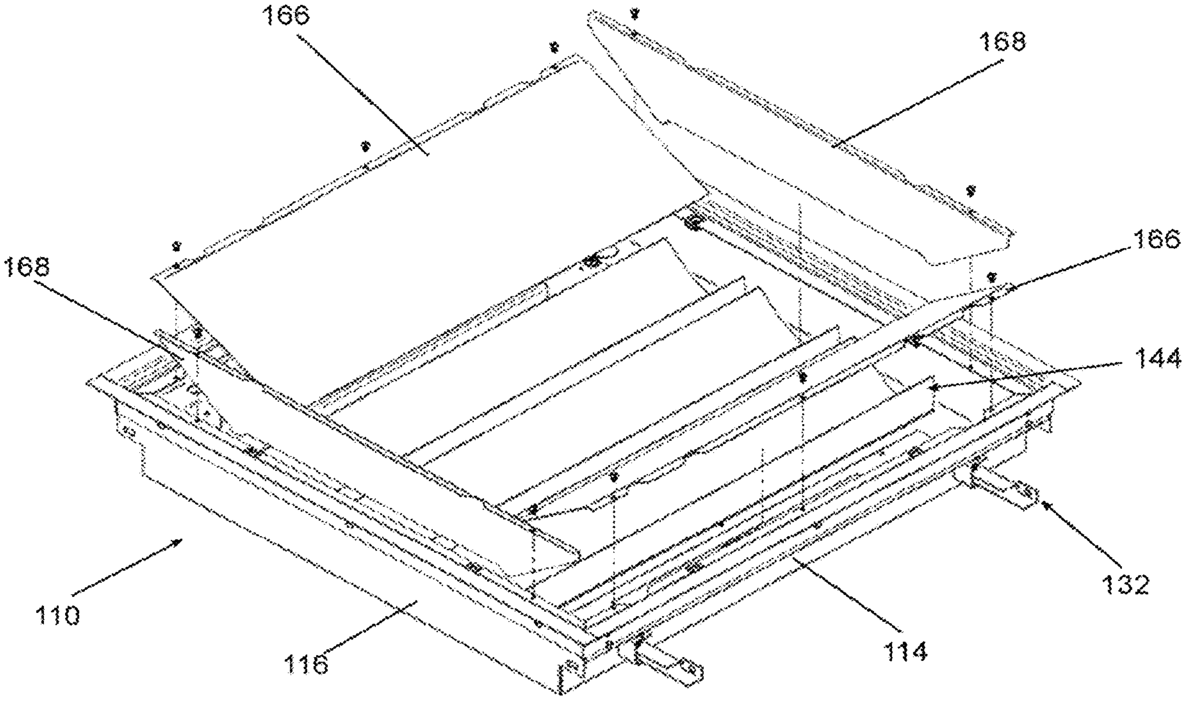
FIG. 8 is a is a bottom perspective, assembly view of exemplary secondary reflectors.

In certain aspects, one or more secondary reflectors can be positioned inside of the housing 110. FIG. 8 shows a secondary reflector assembly that includes a pair of side reflectors 166 and a pair of end cap reflectors 168. The side reflectors 166 and end cap 168 reflectors are positioned around the light assembly reflectors 148 and connected to the lower edge 126 of the housing 110. In the illustrated embodiment, the side reflectors 166 have an asymmetric configuration to correspond to the asymmetric output of the light emitter assembly 144. The configuration of the secondary reflectors can be altered based on the desired light output.

Figure 9:
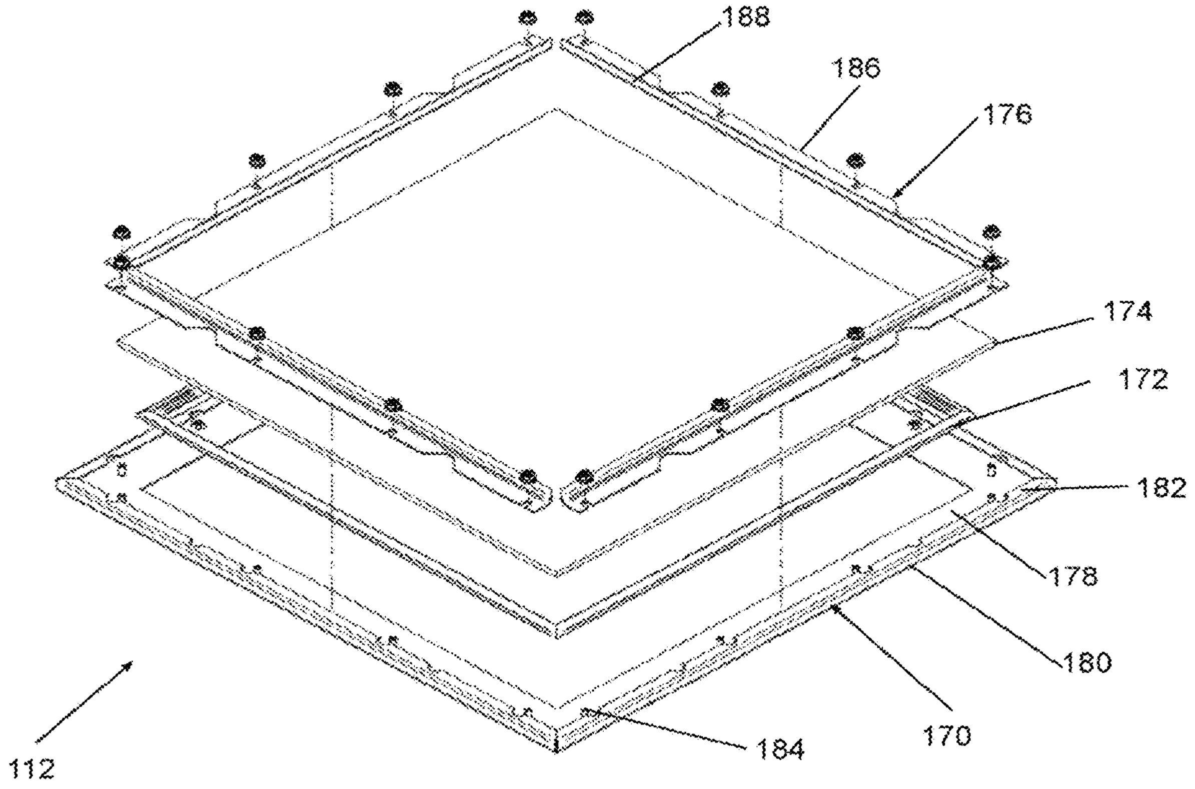
FIG. 9 is a top perspective, assembly view of an exemplary lens assembly.
Figure 10:
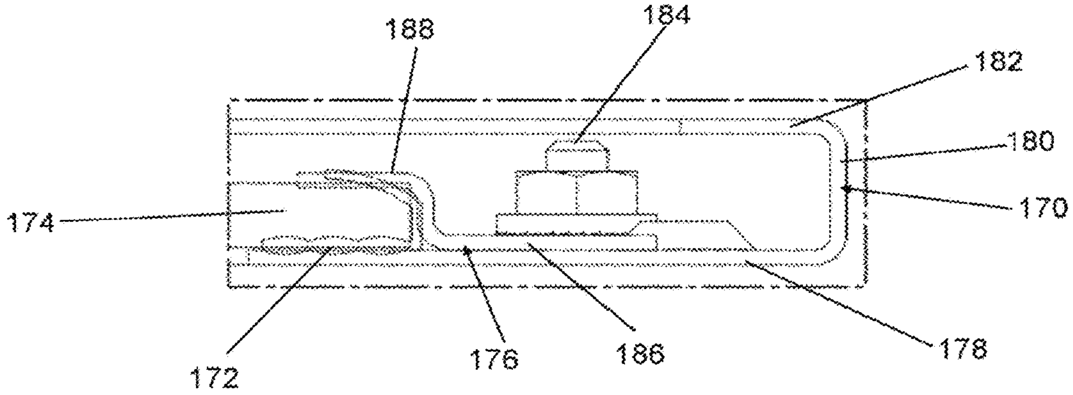
FIG. 10 is a side, enlarged view of a portion of the lens assembly.

FIGS. 9 and 10 show an exemplary embodiment of a door assembly 112 that can be connected to the housing 110 to enclose the light emitter assembly 144, 162. The door assembly 112 includes a frame 170, a gasket 172, a lens 174, and one or more lens brackets 176. The frame 170 includes a lower wall 178 defining a central opening, a side wall 180 extending from the lower wall 178, and an upper edge 182 that extends from the side wall 180 towards the central opening. One or more openings extend through the lower wall 180 to receive a respective fastener 184. The gasket 172 is positioned against the lower wall 180 around the central opening. In certain embodiments, the gasket 172 can have a set of ribs positioned against the lower wall 178.

The lens 174 is positioned against the gasket 172. The lens brackets 176 are positioned against the lens 174 to connect the lens 174 to the frame 170. The lens brackets 176 have a substantially Z-shaped configuration, with a lower flange 186 being secured against the frame 170 and an upper flange 188 secured against the lens 174. Flange nuts can be used to secure the lens brackets 176, compressing the lens brackets 176 against the lens 174, and compressing the gasket 172 between the lens 174 in the frame 170. In this way, a water-tight seal can be formed around the lens 174, helping to prevent the ingress of fluid through the central opening in the frame 170.

Figure 11:
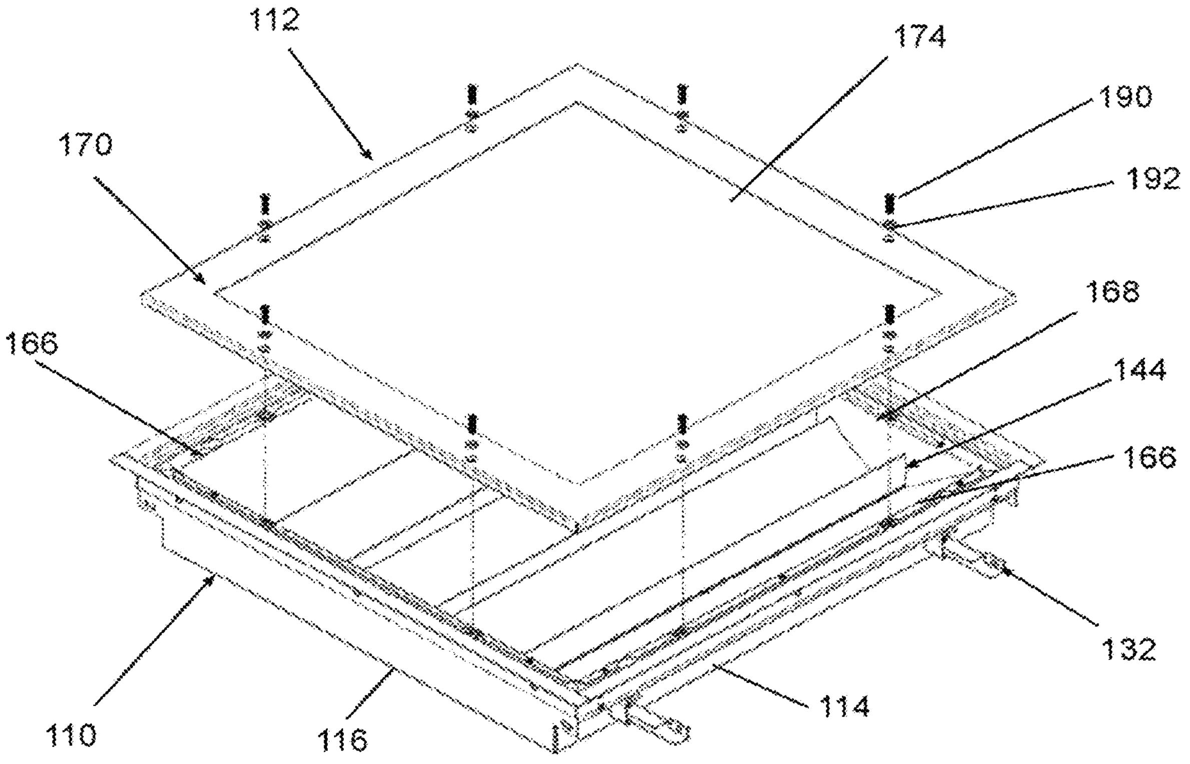
FIG. 11 is a bottom perspective, assembly view of an exemplary door assembly.

As best shown in FIG. 11, the door assembly 112 can be connected to the housing 110 utilizing a set of fasteners 190. Gaskets 192 can be positioned around the fasteners 190 to help seal the door assembly 112 and the interior of the housing 110. The sealed door assembly 112 can be utilized in sterile environments, such as health care locations, and also harsh environments, such as hazardous and wet locations, where frequent cleaning of the unit is required.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms “front,” “rear,” “upper,” “lower,” “upwardly,” “downwardly,” and other orientational descriptors are intended to facilitate the description of the exemplary embodiments of the present disclosure, and are not intended to limit the structure of the exemplary embodiments of the present disclosure to any particular position or orientation. Terms of degree, such as “substantially” or “approximately” are understood by those of ordinary skill to refer to reasonable ranges outside of the given value, for example, general tolerances associated with manufacturing, assembly, and use of the described embodiments. Unless specified or limited otherwise, the terms “mounted,” “connected,” “supported,” and “coupled” and variations thereof are used broadly and encompass both direct and indirect mountings, connections, supports, and couplings.

What is claimed is:

1. A light fixture comprising:

a housing comprising a first end, a second end, a first side and a second side, wherein the first side and second side extend between the first end and the second end, and wherein the housing is configured for securing to a support surface;

a tray connected to the housing, the tray comprising a series of base portions and a series of angled walls, wherein each angled wall extends from a base portion;

a plurality of reflectors connected to the tray, wherein each reflector of the plurality of reflectors is connected to the angled wall;

a plurality of light emitter boards, wherein each light emitter board of the plurality of light emitter boards is connected to a reflector;

a control component positioned within the housing and operably connected to the plurality of light emitter boards; and a door assembly releasably connected to the housing, wherein the door assembly comprises a frame bordering a central opening, a lens positioned over the central opening, and a gasket positioned between the lens and the frame.

2. The light fixture of claim 1, further comprising at least one substantially Z-shaped lens bracket comprising a lower flange and an upper flange, and at least one flange nut, wherein the at least one flange nut secures the lower flange against the lens when tightened and compresses the upper flange against the lens to compress the gasket between the lens and the frame.

3. The light fixture of claim 1, wherein each light emitter board comprises a plurality of light-emitting diodes (LEDs).

4. The light fixture of claim 1, wherein the light emitter boards and the plurality of reflectors are configured to produce an asymmetric light output from the housing.

5. The light fixture of claim 1, wherein each of the angled walls extend at an angle of approximately 20 degrees from the base.

6. The light fixture of claim 1, wherein the control component comprises at least one of a driver, a controller and a sensor.

7. The light fixture of claim 1, wherein the support surface includes a drop panel ceiling grid.

8. The light fixture of claim 1, further comprising at least one flange connected to the housing.

9. The light fixture of claim 1, further comprising at least one adjustable wing hanger connected to the housing.

10. The light fixture of claim 1, wherein the housing includes a lower wall, a side wall extending from the lower wall, and an upper edge that extends from the side wall towards the central opening.

11. The light fixture of claim 10, wherein the gasket is positioned against the lower wall around the central opening.

12. The light fixture of claim 1, wherein the gasket has ribs.

13. The light fixture of claim 1, wherein the door assembly is connected to the housing utilizing a set of fasteners.

14. The light fixture of claim 13, wherein the gasket is positioned around the fasteners.

* * * * *